United States Patent [19]

Hohman et al.

[11] Patent Number: 4,478,627
[45] Date of Patent: Oct. 23, 1984

[54] RECUPERATION OF HEAT ABSORBENT MEDIA TO PREHEAT COMBUSTION GASES AND GLASS BATCH

[75] Inventors: Charles M. Hohman, Granville; Mark A. Propster, Gahanna; Charles Dunn, Pataskala; Stephen Seng, Bladensburg, all of Ohio

[73] Assignee: Owens-Corning Fiberglas Corporation, Toledo, Ohio

[21] Appl. No.: 399,085

[22] Filed: Jul. 16, 1982

[51] Int. Cl.³ ............................ C03B 1/00; C03B 3/00
[52] U.S. Cl. ......................................... 65/27; 65/134; 165/104.18; 165/111; 432/30
[58] Field of Search .................. 65/27, 62, 335, 134; 165/104.18, 111; 432/30, 215, 179

[56] References Cited

U.S. PATENT DOCUMENTS

| | | | |
|---|---|---|---|
| 4,119,395 | 10/1978 | Hatanaka et al. | 65/27 X |
| 4,319,903 | 3/1982 | Hohman et al. | 65/27 |
| 4,338,113 | 7/1982 | Hohman et al. | 165/111 X |
| 4,349,367 | 9/1982 | Krumwiede | 165/111 X |
| 4,386,951 | 6/1983 | Hohman et al. | 65/134 X |

*Primary Examiner*—Kenneth M. Schor
*Attorney, Agent, or Firm*—Ronald C. Hudgens; Philip R. Cloutier; Thomas F. McGann

[57] ABSTRACT

A method of recovering heat from furnace flue gas which comprises passing the hot gases into contact with high specific heat media and the media into contact successively, with combustion gases and glass batch.

7 Claims, 1 Drawing Figure

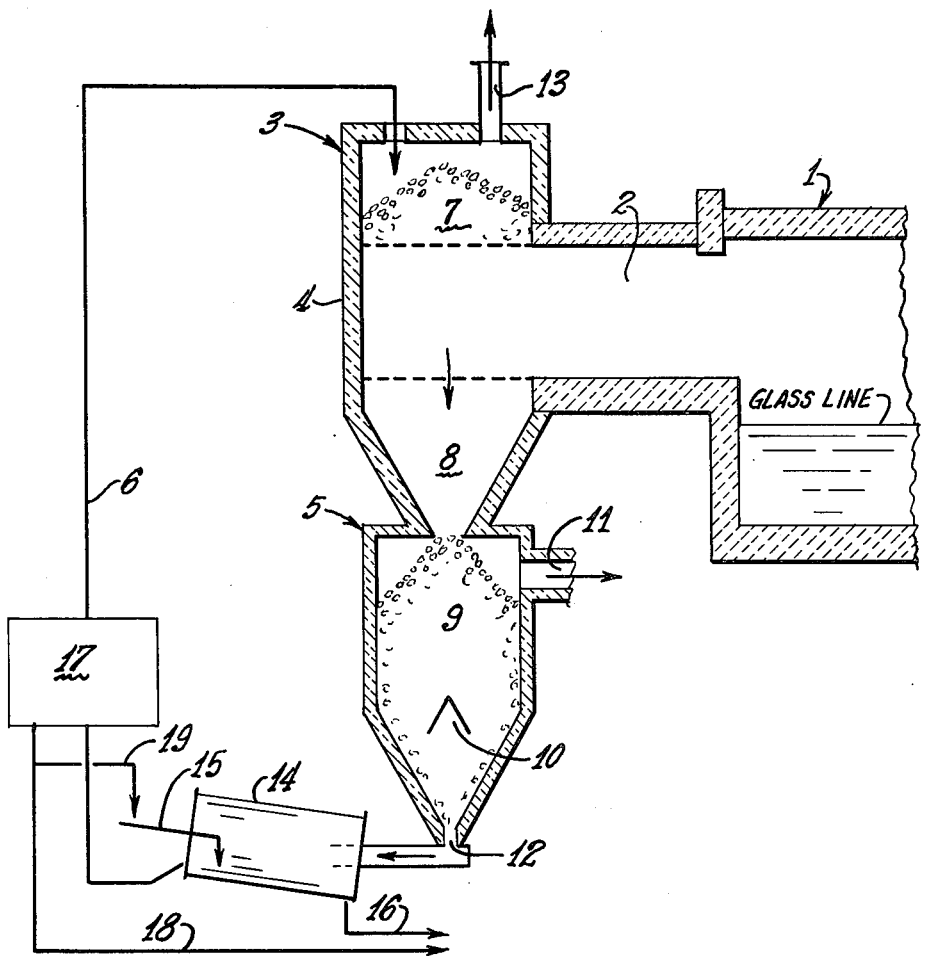

RECUPERATION OF HEAT ABSORBENT MEDIA TO PREHEAT COMBUSTION GASES AND GLASS BATCH

TECHNICAL FIELD

This invention relates to a process for preheating glass batch by combustion gases from a furnace. In one of its more specific aspects, this invention relates to a heat recovery process in which maximum utilization of hot flue gases is employed to preheat those materials introduced into the furnace from which the flue gases are recovered.

BACKGROUND ART

One method for preheating glass batch involves feeding cold particulate glass batch raw materials into one end of a rotating heat-transfer drum, and feeding heated media of larger particle size than the batch particles into the other end of the heat transfer drum. The glass batch moves in countercurrent physical contact with the heated media, with the batch flowing from the cold end to the hot end of the drum and the media flowing from the hot end to the cold end of the drum. The heated particulate batch is removed from the hot end of the drum, and the cooled media is removed from the cold end of the drum. Preferably, the heated media is a high specific heat, durable material and can be comprised of glass batch agglomerates, glass, ceramic material, steel, stainless steel, aluminum, gravel and the like. The media can be of any suitable shape, spherical shapes being preferred. For purposes of simplification such media, heated or unheated, will be referred to herein as heat absorbent media or absorbent media.

STATEMENT OF THE INVENTION

According to the present invention there is provided a method which comprises passing heat absorbent media into contact with hot flue gases to heat the media, passing the media in contact with gases for combustion to heat the gases for combustion and to reduce the temperature of the media and passing the media at reduced temperature into contact with glass batch to heat the batch and passing the batch and heated gases for combustion into a furnace.

BRIEF DESCRIPTION OF THE DRAWINGS

Attached is a flow diagram generally descriptive of carrying out the method of this invention.

BEST MODE OF CARRYING OUT THE INVENTION

Referring now to the drawing, there is shown glass melting furnace 1 from which hot combustion gases are conducted through duct 2 into the upper section 4 of bisectional vessel 3. The combustion gases are distributed throughout section 4 and pass upwardly countercurrently to the heat absorbent media maintained as bed 7 therein, which heat absorbent media moves downwardly, countercurrent to the upward flowing, hotter flue gases which flow from the vessel through outlet conduit 13. The heat absorbent media is thereby heated and the combustion gases cooled.

The preheated heat absorbent media flows downwardly into the lower section 8 of vessel 3 and from there into the upper section 9 of vessel 5.

Introduced into the lower section of vessel 5 is a gas for combustion such as air, used in the firing of the furnace. In vessel 5, the heat absorbent media flows downward in countercurrent flow to the upward flowing, cooler gases for combustion. The heat absorbent media is thereby cooled and the gases for combustion, which leaves the vessel through conduit 11, are heated and introduced into the furnace firing system.

The heat absorbent media which has been cooled in vessel 5, however, still retains a considerable quantity of recoverable heat. The heat absorbent media is therefore conducted from vessel 5 through conduit 12 and into direct contact heat interchanger 14.

Introduced into interchanger 14 through conduit 15 is the ambient glass batch mixture. It passes into direct contact with the heat absorbent media in the interchanger and is discharged therefrom through conduit 16 by means of which the glass batch is transferred into the furnace. The cooled heat absorbent media is discharged from the interchanger through conduit 6 by means of which it is introduced into vessel 3.

Any suitable type of direct contact interchanger can be employed such as a cylindrical drum rotatable on an inclined axis. If desired, any suitable separation means 17 can be installed in conduit 6 and into which the heat absorbent media is introduced and, for example, abraided to remove from the exterior thereof, adhering particles of glass batch or furnace condensate.

The material which is removed from the heat absorbent media can be introduced into the hot batch or furnace through conduit 18 or into the cold batch through conduit 19.

The method of this invention is particularly efficient because of the high heat transfer coefficient which can be taken advantage of if, for example, ceramic spheres are employed as the heat absorbent media.

In general, this two-stage system, in itself, has certain advantages. In the first stage, the preheating can be carried out to reduce the flue gas temperatures as much as practical by heating the absorbent media to as high a temperature as possible. This contemplates a flue gas temperature reduction from about 2700° F. to about 200° F. with an increase in temperature of the absorbent media from about atmospheric to about 2600° F.

In the second stage, the gas for combustion can be controlled in quantity and outlet temperature such that the absorbent media do not tend to overheat and agglomerate the batch in the final heat exchange step. This contemplates a reduction in absorbent media temperature from about 2600° F. to about 1200° F. and an increase in gas for combustion temperature from about atmospheric temperature to about 2000° F. depending upon the agglomeration temperature of the batch to be preheated in the final heat exchange step.

In the final heat exchange step, the absorbent media is ideally cooled to as near atmospheric temperature as possible. This contemplates a reduction in absorbent media temperature from about 1200° F. to about 200° F. and an increase in batch temperature from about atmospheric temperature to about 1000° F., or to a temperature less than the sintering temperature of the batch.

It will be evident from the foregoing that various modifications can be made to this invention. Such, however, are considered within the scope of the invention.

We claim:
1. A method of recovering waste heat from a furnace which comprises:
   (a) passing hot flue gases into contact with heat absorbent media to heat said media and cool said hot flue gases, and passing said cooled flue gases to outlet conduit;

(b) passing said heated media into contact with gases for combustion to heat said gases for combustion and partially to cool said heated media, and passing said heated gases for combustion into firing system of said furnace;

(c) passing said partially cooled media into contact with cold glass batch to heat said cold glass batch and to cool further said partially cooled media, and passing said heated glass batch into said furnace;

(d) passing said further cooled media through separation means to clean said further cooled media by removing adhering particles of said glass batch and furnace condensate from said further cooled media;

(e) passing said cleaned further cooled media into position to contact said hot flue gases; and (f) passing said removed particles of glass batch and furnace condensate into either said furnace or into said cold glass batch.

2. The method of claim 1 in which said hot flue gases and said heat absorbent media are passed in counter-current flow, said gases for combustion and said heated media are passed in counter-current flow and said glass batch and said partially cooled media are passed in counter-current flow.

3. The method of claim 2 in which said heat absorbent media is passed, sequentially, in contact with the hot flue gases, the gases for combustion and the glass batch.

4. The method of claim 1, step (d), in which said separation means comprises means to abrade said further cooled media.

5. The method of claim 1 in which said flue gas temperature is reduced from about 2700° F. to about 200° F. and said heat absorbent media is heated from about atmospheric temperature to about 2600° F.

6. The method of claim 1 in which said gases for combustion is increased in temperature from about atmospheric temperature to about 2000° F. and said heated media is decreased in temperature from about 2600° F. to about 1200° F.

7. The method of claim 1 in which said partially cooled media is decreased in temperature from about 1200° F. to about 200° F. and said glass batch is increased in temperature from about atmospheric temperature to about 1000° F.

* * * * *